INVENTOR.
CHARLES L. VEHRS JR.

June 25, 1968  C. L. VEHRS, JR  3,390,390
CLUTTER-FORTIFIED MTT SYSTEM
Filed Jan. 16, 1967  4 Sheets-Sheet 3

INVENTOR.
CHARLES L. VEHRS JR.
BY
ATTORNEY

ABSTRACT OF THE DISCLOSURE

The subject invention relates to a sum-channel-normalized, monopulse-type clutter-fortified moving target-tracking system, and includes means for avoiding angular tracking errors due to tracking of the combined centroid of the target and clutter. A compensatory clutter-fortifier provides a clutter sample from each horn of a monopulse horn pair, the samples being sum channel normalized to clutter at the target range of interest. The normalized clutter sample from each horn, or signalling channel, is injected into the other of the two channels or horns, to effect a more nearly symmetrical fortified clutter state, prior to clutter-reference Doppler processing.

Cross-references to related applications (1) Application Ser. No. 391,073, filed Aug. 18, 1964, by F. J. Dynan et al., for AMTI Radar System.

(2) Application Ser. No. 556,940, filed June 13, 1964, by W. E. Stoney for Moving Target Tracking System.

(3) Application Ser. No. 566,970, filed July 21, 1966, by W. E. Stoney for Moving Target Angle Tracking System.

Background of the invention

Radar angle-tracking of moving targets in ground clutter by means of a non-coherent monopulse radar using clutter-referenced Doppler processing, requires the presence of a clutter reference of an amplitude sufficiently greater than that of the target. The concepts of spectrally distinguishing a clutter-referenced signal (indicative of a moving target) from the clutter reference itself by means of selected bandpass filtering is described more fully in application Ser. No. 391,073, filed Aug. 18, 1964, by F. J. Dynan et al., assignors to North American Aviation, Inc., assignee of the subject invention.

For conditions where the clutter signals (at the target range of interest) become weaker than the target signals, the target signal becomes the Doppler reference and the tracking angle signals derived from the Doppler modulation tend to be proportional to the clutter deviation from boresight. Under such latter conditions, the system tracks the clutter. In conditions where the clutter reference signals are greater, but not sufficiently greater than the target signals, the Doppler filtering or Doppler processing of the receiver permits the MTT system to track somewhere between the target position and the clutter position, in the absence of proper signal compensation. Such marginal clutter levels are referred to as twilight clutter zones.

Means for reducing such twilight clutter zones by clutter fortification has been described in co-pending application Ser. No. 556,940, filed by June 13, 1964, and in application Ser. No. 566,970, filed July 21, 1966, both of which were filed by W. E. Stoney, assignor to North American Aviation, Inc., assignee of the subject invention. The clutter fortification techniques disclosed by such references, while overcoming the twilight clutter tracking problem, do not prevent those tracking errors arising due to the asymmetry of the fortified clutter references employed. In fact, such asymmetry in the clutter references generally occurs, even in the absence of either clutter fortification or the need for clutter fortification.

For example, in the elevation-angle tracking mode of a monopulse tracking system employing mutually-angularly squinted upper and lower monopulse horns for determining whether a target is above or below the boresight axis of such horn pair, the clutter content of the radar echoes received by the lower horn will, in general, be greater than that received by the upper horn. Therefore, the beat-frequency component of a clutter-referenced receiver signal, caused by the mixing or beating of the clutter return and the moving target return (Doppler-shifted, relative to the clutter return) in the non-coherent detection of the return from such lower horn, will produce a larger cross-product for a moving target located on boresight, than will the non-coherent detection and mixing of the corresponding return from the upper horn. Thus, the comparison of or difference between the two (non-coherent, non-linearly detected) moving target component signals would not result in a null indicative of an on-boresight direction of the moving target. In other words, the Doppler-processed monopulse difference channel response tends to be biased in the direction of the clutter centroid. Accordingly, in a weapon system involving an airborne-launched missile having a clutter-referenced moving target tracking system responsive to radar echoes from airborne targets illuminated by a radar transmitter on-board the launching vehicle, the missile may be observed to pass under the target (i.e., between the target and the clutter source).

Summary of the invention

By means of the concept of the subject invention, the disadvantages and performance limitations of prior art clutter referenced MTT systems are avoided, and a more-nearly symmetrical clutter reference is provided so as to avoid tracking the combined centroid of the clutter and target.

In a preferred embodiment of the invention, there is provided a monopulse-type non-coherent clutter-fortified moving target tracking system having a first and second clutter sampling means responsive to a respective one of the signalling channels of a monopulse signal channel pair of the monopulse system. First and second signal injection means is interposed in circuit with a respective one of the first and second monopulse signalling channels, the first signal injection means being responsive to the second clutter sampling means and the second signal injection means being responsive to the first clutter sampling means.

In normal operation of the above described arrangement, the generally unequal clutter samples in each of the two clutter-referenced signalling channels of a single-planar angle-sensing arrangement of a monopulse receiver are cross-fed from one to the other of the two channels, whereby the resulting clutter-reinforced clutter references are equal and tracking errors due to asymmetry in the clutter references are avoided. Accordingly, an object of the invention is to provide an improved target tracking system.

Another object of the invention is to provide a MTT system having improved accuracy.

Still another object of the invention is to provide a clutter-referenced MTT system having improved symmetry in the clutter reference.

A further object of the invention is to provide a clutter-referenced MTT system of reduced tracking sensitivity to the clutter centroid.

Brief description of the drawings

These and other objects of the invention will become apparent from the following description of the invention, taken together with the accompanying drawings, in which.

3

Figure 1:
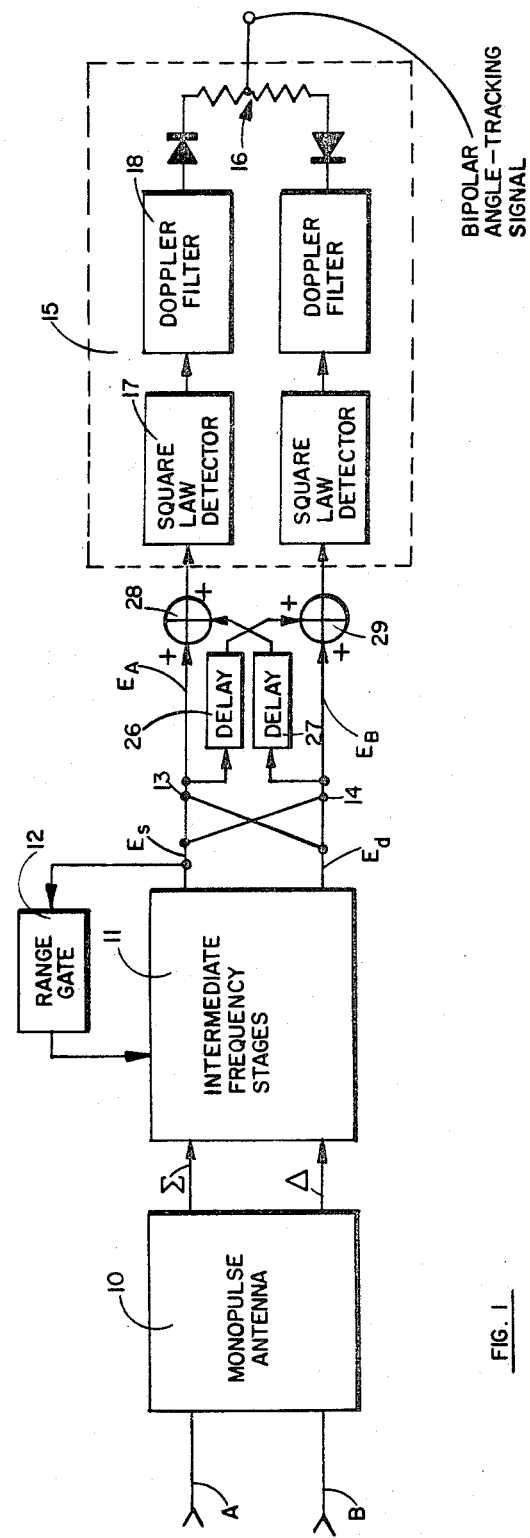
FIG. 1 is a block diagram of a system embodying the inventive concept.
Figure 2:
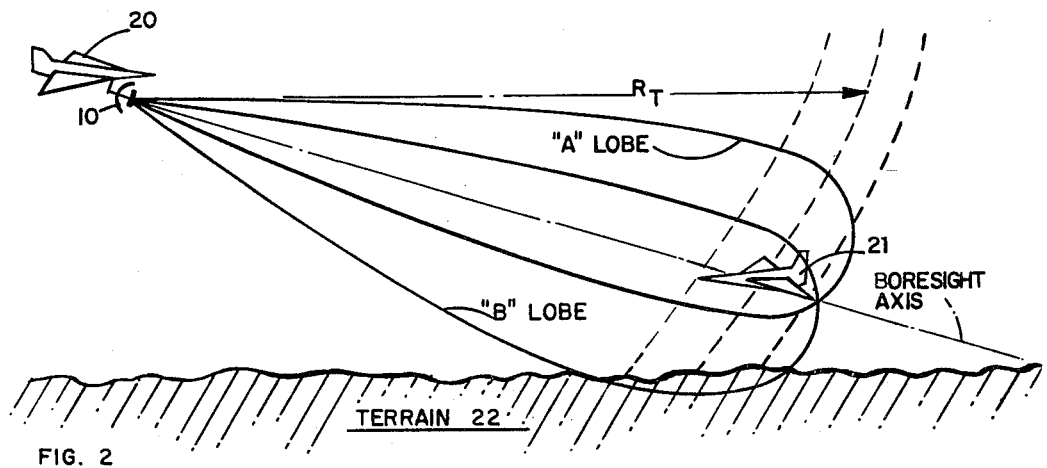
Figure 3:
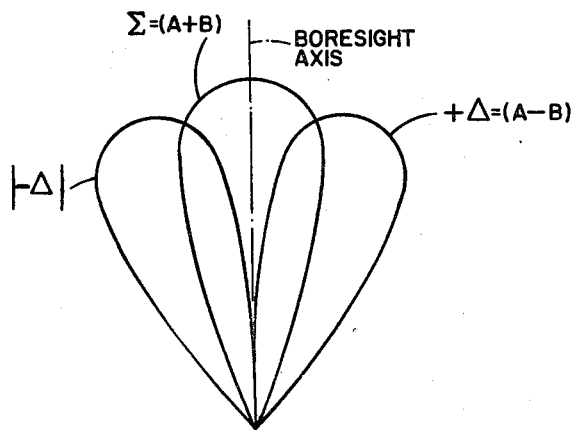
Figure 4:
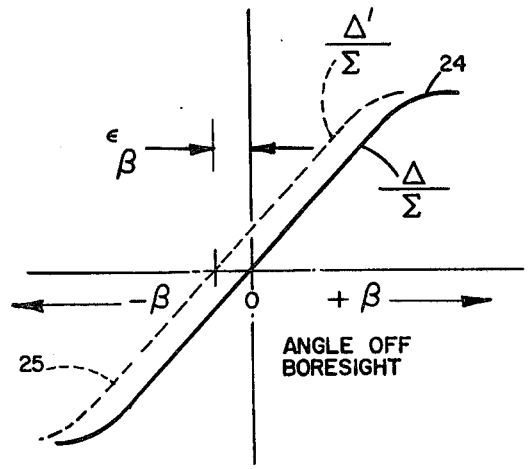
Figure 5:
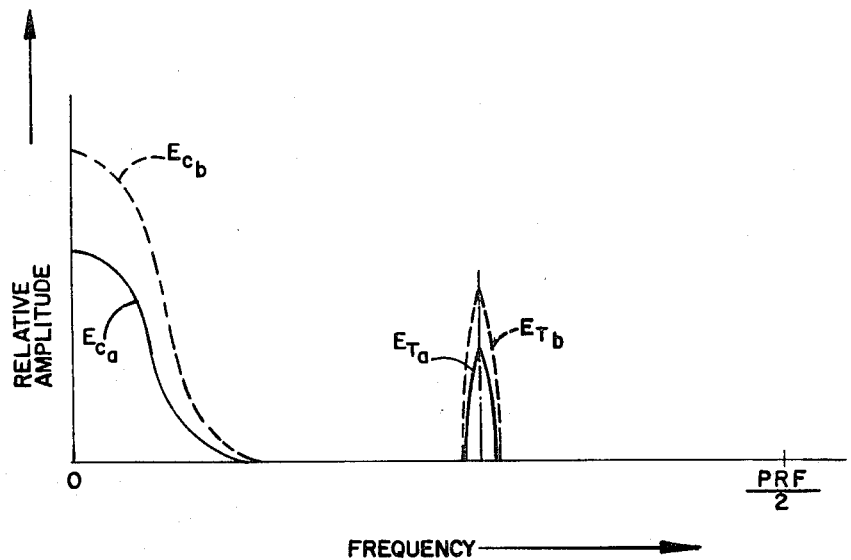
Figure 6:
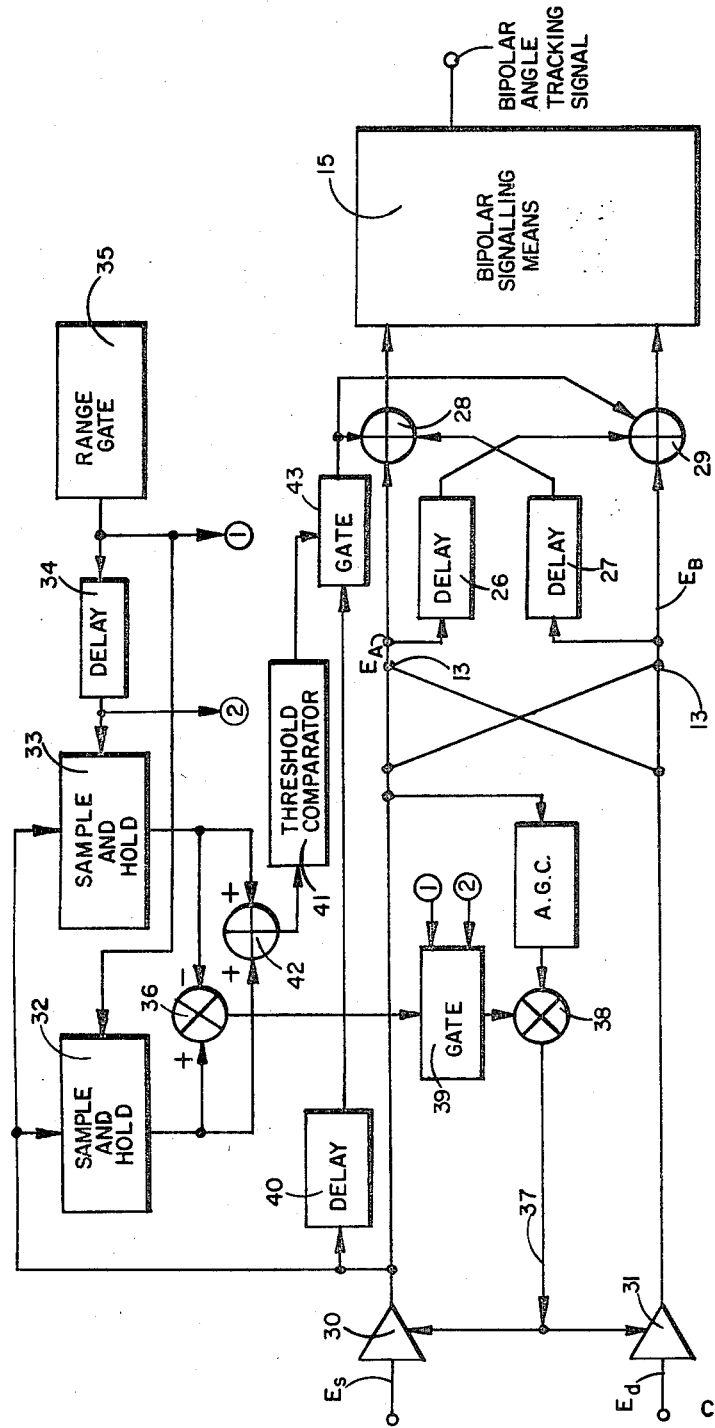

FIG. 2 is a diagram illustrating the geometry of a tactical situation in which the system of FIG. 1 may be advantageously employed;

FIG. 3 is a diagram (in polar coordinate form) of the sum of and difference between the dual energy lobe pattern in FIG. 2;

FIG. 4 is a diagram (in cartesian coordinate form) of the monopulse ratio $\Delta/\Sigma$ versus $\beta$ (target angle) for an examplary clutter-free (or clear air) mode and also for a clutter-referenced MTT mode, showing the biasing effect of an asymmetrical clutter reference;

FIG. 5 is a spectral diagram of a family of curves, illustrating the component responses of the video signalling stages of a prior art clutter-referenced MTT system; and FIG. 6 is a block diagram illustrating a further aspect of the invention.

In the figures, like reference characters refer to like parts.

*Description of the preferred embodiments*

Referring now to FIG. 1, there is illustrated in block diagram form a system embodying the invention concept. There is provided a monopulse-type clutter-fortified, non-coherent MTT system comprising a monopulse antenna (including a micro-wave bridge or hybrid labyrinth) 10 having apertures A and B and microwave outputs $\Sigma$ and $\Delta$, corresponding to the sum and difference, respectively, of the signals separately received by apertures A and B. Intermediate frequency stages 11 may also be included for reducing the microwave signals to an intermediate frequency more convenient for amplification and other signal processing. Such other signal processing may include signal compression or normalization to reduce the effects of changes in target range and coefficient of reflectivity upon signal strength; and may also include range-gating at the range of a selected target (where the system includes a range-tracking function), as indicated by block element 12. There is also provided first and second signal combining means 13 and 14 responsive to the compressed intermediate frequency sum and difference signals, $E_s$ and $E_d$, for providing a respective first and a second compressed received signal, $E_A$ and $E_B$.

The construction and arrangement of elements 10, 11 and 12 are well unerstood in (as indicated in U.S. Patent 3,177,484, issued Apr. 6, 1965, to R. O. Case et al., for Position Indicating System) and therefore, these elements are shown in block form only for convenience in exposition. Signal combining means 13 and 14 may be comprised of a four terminal hybrid network or the like, the construction and arrangement of which are also well understood in the art, as indicated for example in U.S. application Ser. No. 221,653, filed Aug. 29, 1964, by J. A. Moulton, assignor to North American Aviation, Inc., assignee of the subject invention.

The compressed intermediate frequency signals $E_A$ and $E_B$, corresponding to the received microwave signals at apertures A and B, respectively, of antenna means 10, are fed to respective inputs of bipolar signalling means 15 for the generation of bipolar steering, or angle-tracking, the sense of which is indicative of the sense of the angle-off-boresight of the detected target producing such signal. Bipolar signalling means 15 is comprised of a third signal combining means 16 having first and second oppositely poled summing inputs, each coupled to a respective one of the IF inputs of bipolar signalling means 15 by non-coherent video detection means. Such video detection means may be comprised of a square law detector 17 for providing a clutter-referenced video signal and a Doppler-processor 18 for removing the Doppler reference, retaining the Doppler-shifted moving target component. The arrangement and cooperation of such non-coherent square law detector 17 and Doppler processor 18 for recovering a signal indicative of a moving target is described more fully in a copending U.S. application Ser. No. 391,073,

4 filed Aug. 18, 1964, by F. J. Dynan et al., assignee of the subject invention.

The description of that portion of system thus far described, without benefit of the invention, may be appreciated from a consideration of FIGS. 2, 3, 4 and 5.

Referring to FIG. 2, there is illustrated an exemplary diagram of the geometry of a tactical situation in which the system of FIG. 1 may be employed, showing a utilizing vehicle 20 upon which is mounted the monopulse system of FIG. 1, the antenna apertures A and B of which provide corresponding "A" and "B" lobes, respectively, in an elevation, or vertically stacked, array. A detected moving target 21 at range $R_T$ lying on the antenna pattern axis of symmetry, or boresight axis, is detected in both A and B lobes of antenna 10. Also detected at range $R_T$ is the clutter return, or radar echoes, from that portion of terrain 22 within the antenna pattern at such range. Such clutter return, however, is from a different direction than the echo return from target 21, the clutter source 22 being located below target 21.

The sum and difference ($\Sigma$ and $\Delta$, respectively) of the microwave inputs A and B of monopulse antenna correspond to the field patterns shown in FIG. 3. As is understood in the monopulse art, within the main lobe of the sum pattern response ($\Sigma$) the difference signal ($\Delta$) increases from a null (for a target lying on boresight) as the angular position $\beta$ of a detected target off-boresight is increased. The variation of such signal with the variation of other parameters is usually sought to be avoided by signal compression technique employing the signal ratio $\Delta/\Sigma$, as shown in FIG. 4 by curve 24, which demonstrates a null at $\beta=0$.

However, in the Doppler processing of clutter referenced signals, an offset or bias occurs, as shown by curve 25 in FIG. 4. Such offset is manifested as a null $\Delta'/\Sigma$ at a negative value of the angle-off-boresight ($E_\beta$) or as a finite signal level other than null for a target on-boresight ($\beta=0$). Such signal condition occurs due to the fact that the lower "B" lobe in FIG. 2 receives a stronger clutter return than does the "A" lobe, because of the orientation difference therebetween, the "B" lobe being angularly squinted slightly downwardly relative to the "A" lobe orientation. The effect of such orientation difference is illustrated in the spectral diagram of FIG. 5.

Referring to FIG. 5, there is illustrated a family of spectral responses of the noncoherent video detection of a clutter-referenced return, containing a moving target signal, for both of the "A" and "b" lobes of a monpulse elevation channel. The curves $E_{c_a}$ and $E_{t_a}$ represent the respective clutter and target video detected spectral components of the return received by the "A" lobe of FIG. 2, while the curves $E_{c_b}$ and $E_{t_b}$ represent the respective clutter and target components of the "B" lobe return. It is to be noted that for the situation illustrated in FIG. 2, the clutter return for the "B" lobe is greater than that for the "A" lobe ($E_{c_b} > E_{c_a}$).

The video detected clutter return, convolved about zero frequency, results from the beating or mixing of the clutter portion of the nonlinearly detected viedo spectrum with itself, while the video-detected target cusps, $E_{t_a}$ and $E_{t_b}$, result from the beating or mixing of the clutter spectrum with the Doppler-shifted moving target spectrum. Hence, even though the moving target 21 of FIG. 2 lies on the boresighted of antenna 10, whereby the received target signals in the "A" and "B" lobes are equal, yet the non-linear detection or mixing of such equal amplitude signals with unequal clutter references will result in unequal video moving target signals ($E_{t_b} > E_{t_a}$), as shown in FIG. 5. Accordingly, the result of separate Doppler processing and differential combination of such video moving target signals, by the bipolar signalling means 15 of FIG. 1, would result in the undesirable offset response illustrated by curve 25 ($\Delta'/\Sigma$) of FIG. 4.

Such undesirable response characteristic is reduced in the arrangement of FIG. 1 by the incorporation of means for sampling the clutter in each of the A and B signalling channels of FIG. 1 and injecting such sample into the other of the two channels to provide a more nearly like (fortified) clutter component in each channel. In FIG. 1 such clutter sampling means comprises a first and second delay elements 26 and 27 responsive to the intermediate frequency A and B channel signals, $E_A$ and $E_B$, respectively. There is also provided first and second signal injection means 28 and 29 interposed in series-circuit with a respective one of the intermediate frequency "A" and "B" channel inputs to signalling means 15, first signal injection means 28 being responsively coupled to second clutter sampling means 27 and second signal injection means 29 being responsive to first clutter sampling means 26. The like delays provided by delay sampling means 26 and 27 are preselected to correspond to a sub-interval portion, or half, the gating interval of the range tracker of the range tracking receiver. Alternatively, where no range-tracking unit is provided, such delay may correspond to, say, three pulsewidths of a transmitter (not shown) associated with such system.

In normal operation of the above described arrangement, the early clutter return of one channel is combined with the late clutter and target return of the other channel. Alternatively, a late clutter sample could be employed by delaying the target and clutter signal of one channel and combining with it the (undelayed) later clutter sample from the other channel. In either case a clutter sample outside of and proximate to the target range of interest, is taken from each channel for fortification of the other channel in order to provide more nearly like (fortified) clutter references in both channels. In this way the signal levels of the doppler processed moving target signals, $E_{t_a}$ and $E_{t_b}$ are not distorted due to asymmetries existing between the clutter references employed.

The arrangement of FIG. 1 will operate with excellent results where the clutter sample ($E'_c$) from a given channel is essentially equal to the clutter level ($E_c$) in such channel at the target range of interest, ($E'_{c_a}=E_{c_a}$, and $E'_{c_b}=E_{c_b}$). Then:

$$E'_{c_a}+E_{c_b}=E_{c_a}+E_{c_b}$$

and $$E'_{c_b}+E_{c_a}=E_{c_b}+E_{c_a}$$

Therefore, the fortified clutter in both channels would be equal, as desired:

$$E'_{c_a}+E_{c_b}=E'_{c_b}+E_{c_a}$$

Where minor differences exist between the clutter reference at the target range $R_t$ and the clutter sample at the sample range (due to terrain differences), then minor asymmetries may yet exist in the fortified clutter. Such minor asymmetries may be compensated for by the arrangement of FIG. 6.

Referring to FIG. 6, there is illustrated a preferred embodiment of the inventive concept, including means for normalizing the clutter sample to the clutter reference to further improve the symmetry of the fortified clutter reference, and also including means for symmetrically further fortifying the fortified clutter reference. There is provided intermediate frequency monopulse sum and difference signal compression means including an automatic gain controlled amplifier 30 and 31 in each of the sum and difference IF channels of a monopulse receiver, each of which amplifiers having a gain control input coupled to the output of the sum channel amplifier 30. Such arrangement comprises a signal-compression portion of the intermediate frequency block 11 of FIG. 1, and tends to normalize the responses of the monopulse sum and difference channels as functions of the sum channel response, as is well understood in the monopulse art. There are also provided elements 13, 14, 15, 26, 27, 28 and 29 constructed and arranged to cooperate substantially the same as like referenced elements of FIG. 1.

There is further provided in FIG. 6 first and second sample-and-hold means 32 and 33, each responsive to the normalized sum channel of the range-tracking monopulse receiver and further having a gate control input coupled to a range-gating output of the range-tracking monopulse receiver. A delay 34 is interposed between the control input of the second sample-and-hold means 32 and the range-gating source 35, which delay preferably corresponds to that provided by each of first and second delay elements 26 and 27. Differential signalling means 36 responsive to the outputs of sample-and-hold means 32 and 33 provides an incremental gain control bias which is coupled to the AGC control input 37 by gated signal injection means for commonly biasing the gain control inputs of amplifiers 30 and 31 during a clutter sampling interval. Such gated injection means comprises a signal summing element 38 interposed in the AGC control circuit 37 and having an input coupled to the output of differential means 36 by signal gating means 39 having first and second switching control inputs respectively coupled to the input and output of delay element 34.

By means of the cooperation of gated injection means 38 and 39, any difference between the combined sample clutter level ($E'_{c_a}+E'_{c_b}$) and the combined target clutter-reference is employed during the clutter-sampling interval to adjust the clutter-sample level so as to reduce such difference. In other words:

$$E'_{c_a}+E'_{c_b} \rightarrow E_{c_a}+E_{c_b}$$

Hence, the symmetry of ($E'_{c_a}+E_{c_b}$) and $E'_{c_b}+E_{c_a}$ is further improved.

While the clutter-fortification provided by the cooperation of elements 26, 27, 28 and 29 serves to provide an improved symmetry in the clutter reference of a clutter referenced Doppler-processed angle-tracking signal, such clutter fortification may yet not provide an adequate level of clutter so as to avoid twilight clutter zones and associated tracking problems. Where no clutter source exists at the target and clutter sample range ($R_T \mp \Delta R$) of interest, for example, further clutter fortification may be desirable. Additional symmetrical clutter fortification may be provided by sum channel early-range clutter-sampling at a range interval substantially removed from the target range of interest, and a corresponding delay, or memory, element 40 employed for symmetrically, or commonly, injecting such sum channel clutter sample into each of the compressed IF A and B signalling channels by means of signal injection means 28 and 29. (A type of early range clutter-sampling memory device is described, for example, in the above mentioned U.S. application Ser. No. 566,970, filed July 21, 1966, by W. E. Stoney.) If desired, such symmetrical clutter injection may be gated-on only in response to a combined clutter-sample and clutter-reference condition less than a preselected threshold amount. Such gating function may be provided by a gate 43 interposed between the output of delay 40 and the associated inputs to injection elements 28 and 29 and coupled to a threshold comparator 41 which, in turn, is responsive to the sum of the outputs of sample-and-hold means 32 and 33, as provided by signal summing means 42.

Accordingly, it is appreciated that the disclosed concept provides improved clutter fortification means in a clutter referenced MTT for providing a more nearly symmetrical clutter reference. In this way, moving target tracking angle errors due to tracking of the combined centroid of the target and clutter are avoided. Therefore, an improved clutter-referenced MTT system has been described.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a monopulse-type clutter-fortified moving target tracking system, means for avoiding tracking errors due to tracking of the combined centroid of target and clutter, comprising a compensatory clutter fortifier, characterized by first and second clutter sampling means responsive to a respective one of the signalling channels of a monopulse signal channel pair of said monopulse system; and first and second signal injection means interposed in circuit with a respective one of said first and second monopulse signalling channels, said first signal injection means being responsive to said second clutter-sampling means and said second signal injection means being responsive to said first clutter sampling means, whereby a more nearly symmetrical clutter reference is provided.

2. The device of claim 1 in which there is further provided signal compression means for normalizing the responses of said first and second monopulse signalling channels as a function of the sum of the responses thereof.

3. The device of claim 2 in which said signal compression means further includes means for normalizing the responses of said first and second clutter sampling means as a function of the sum of the responses thereof.

4. The device of claim 2 in which there is further provided threshold-gated means for symmetrically further fortifying the normalized clutter reference provided, when said reference is below a preselected threshold.

5. In a range-tracking monopulse receiver providing the sum and the difference of two received signals, the combination comprising sum and difference signal compression means including an automatic gain-controlled amplifier in each of a sum and difference signal channel of said receiver, each of said gain-controlled amplifiers having a gain control input coupled to an output of said sum channel;

first and second signal combining means responsive to said compressed sum and difference signals for providing a first and second compressed received signal, respectively;

like first and second sample delay means responsive to a respective one of said first and second compressed received signals for delaying said signal by an interval within a gating interval of said range-tracking receiver to provide a first and second clutter-fortification signal;

first signal summing means, having a first input responsive to said first compressed received signal and a second input responsive to said delayed second compressed received signal to provide a clutter-fortified first received signal;

second signal summing means having a first input responsive to said second compressed received signal and a second input responsive to said delayed first compressed received signal to provide a clutter-fortified second received signal; and bipolar signalling means having a first and second input coupled to a respective one of said signal combining means for providing an angle tracking signal.

6. The device of claim 5 in which there is provided threshold-gated means for symmetrically further fortifying the normalized clutter reference provided when said reference is below a preselected threshold.

7. The device of claim 5 in which said bipolar signalling means comprises third signal combining means having first and second oppositely poled summing inputs;

first and second non-coherent non-linear mixing-detecting means coupled to a respective one of said inputs to said bipolar signalling means; and first Doppler processing means interconnecting an output of said first mixing-detecting means and said first summing input of said third signal combining means; and second doppler processing means interconnecting an output of said second mixing-detecting means and said first summing input of said third signal combining means.

8. The device of claim 5 in which said signal compression means includes means for normalizing the clutter-fortification components of said clutter fortified received signals as a function of the sum of said clutter fortification components.

9. The device of claim 8 in which there is further provided threshold-gated means for symmetrically further fortifying the normalized clutter-reference provided when said reference is below a preselected threshold.

10. The device of claim 5 in which said signal compression means includes means for normalizing the clutter fortification components of said clutter fortified received signals as a function of the sum of said clutter fortification components, and comprising first and second sample-and-hold means, each responsive to said sum channel of said range-tracking monopulse receiver and having a gate control input coupled to a range-gating output of said range tracking monopulse receiver, a delay being interposed between the control input of said second sample-and-hold means and said range gating output and corresponding to the delay provided by said like first and second delay means;

differential signalling means responsive to an output of each of said sample-and-hold means for providing an incremental automatic gain control bias; and gated signal injection means coupled to the output of said differential signalling means for commonly biasing the gain control inputs of said gain controlled amplifiers during a clutter fortification sampling interval.

11. The device of claim 10 in which there is provided means for symmetrical further fortified signals, comprising:

sample-and-hold signal combining means coupled to the outputs of said first and second sample-and-hold means;

a signal comparator coupled to the output of said sample-and-hold signal combining means for providing a gate control output signal indicative of an input state below a preselected threshold level;

gated delay means intercoupling a further input of each of said first and second signal summing means to the output of said sum signal compression means and having a gate control input responsive to the output state of said comparator, whereby a like further clutter fortification component is commonly injected at said signal summing means when the input to said comparator is below said preselected threshold level.

No references cited.

RODNEY D. BENNETT, *Primary Examiner.*

J. P. MORRIS, *Assistant Examiner.*